(12) United States Patent
Zita et al.

(10) Patent No.: US 10,905,994 B2
(45) Date of Patent: Feb. 2, 2021

(54) ATMOSPHERE CONTROL FOR CARGO STORAGE SPACES

(71) Applicant: THERMO KING CORPORATION, Minneapolis, MN (US)

(72) Inventors: Jirí Zita, Jedovnice (CZ); Petra Stavova, Beroun (CZ); Tomáš Kohoutek, Cerveny Ujezd (CZ); Michal Kolda, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 224 days.

(21) Appl. No.: 16/052,992

(22) Filed: Aug. 2, 2018

(65) Prior Publication Data

US 2019/0039011 A1 Feb. 7, 2019

(30) Foreign Application Priority Data

Aug. 3, 2017 (GB) .................................. 1712494.2

(51) Int. Cl.
*B01D 53/02* (2006.01)
*B01D 53/04* (2006.01)
(Continued)

(52) U.S. Cl.
CPC .......... *B01D 53/0446* (2013.01); *A23B 7/148* (2013.01); *A23L 3/3418* (2013.01);
(Continued)

(58) Field of Classification Search
CPC ............. A23B 7/148; B01D 2253/116; B01D 2256/10; B01D 2256/12; B01D 2257/504; B01D 2257/7022; B01D 2259/4525; B01D 2259/455; B01D 2259/4566; B01D 53/0446; B01D 53/0454; B01D 53/22; B01D 53/30
See application file for complete search history.

(56) References Cited

U.S. PATENT DOCUMENTS

| 5,333,394 A * | 8/1994 | Herdeman | ............. A23B 7/148 |
| | | | 34/218 |
| 2014/0230346 A1* | 8/2014 | Blumberg | ................. E04H 1/00 |
| | | | 52/143 |

FOREIGN PATENT DOCUMENTS

| EP | 0294036 | 12/1988 |
| EP | 0467668 | 1/1992 |

(Continued)

OTHER PUBLICATIONS

Great Britain Search Report issued in GB 1712494.2 dated Feb. 5, 2018 (3 pages).

(Continued)

*Primary Examiner* — Christopher P Jones
(74) *Attorney, Agent, or Firm* — Hamre, Schumann, Mueller & Larson, P.C.

(57) ABSTRACT

A controlled atmosphere system for a cargo storage space, the system comprising a separation area for receiving atmospheric gas from the cargo storage space, a gas moving device arranged to move atmospheric gas from the cargo storage space into the separation area to thereby increase a pressure within the separation area, and a molecular sieve arranged in communication with the separation area, such that when the separation area is at an overpressure, selected molecules are vented out of the separation area through the molecular sieve.

24 Claims, 3 Drawing Sheets

(51) Int. Cl.
*A23B 7/148* (2006.01)
*B01D 53/22* (2006.01)
*A23L 3/3418* (2006.01)
*B01D 53/30* (2006.01)
*B65D 88/74* (2006.01)
*F25D 11/00* (2006.01)
*F25D 17/04* (2006.01)
*F25D 23/00* (2006.01)

(52) U.S. Cl.
CPC ......... *B01D 53/0454* (2013.01); *B01D 53/22* (2013.01); *B01D 53/30* (2013.01); *B65D 88/74* (2013.01); *F25D 11/003* (2013.01); *F25D 17/042* (2013.01); *F25D 23/006* (2013.01); *B01D 2253/116* (2013.01); *B01D 2256/10* (2013.01); *B01D 2256/12* (2013.01); *B01D 2257/504* (2013.01); *B01D 2257/7022* (2013.01); *B01D 2259/455* (2013.01); *B01D 2259/4525* (2013.01); *B01D 2259/4566* (2013.01)

(56) References Cited

FOREIGN PATENT DOCUMENTS

| | | |
|---|---|---|
| EP | 0565291 | 10/1993 |
| WO | 96/01573 | 1/1996 |
| WO | 2015/191878 | 12/2015 |

OTHER PUBLICATIONS

Extended European Search Report, European Patent Application No. 18187082.5, dated Jan. 2, 2019 (10 pages).

\* cited by examiner

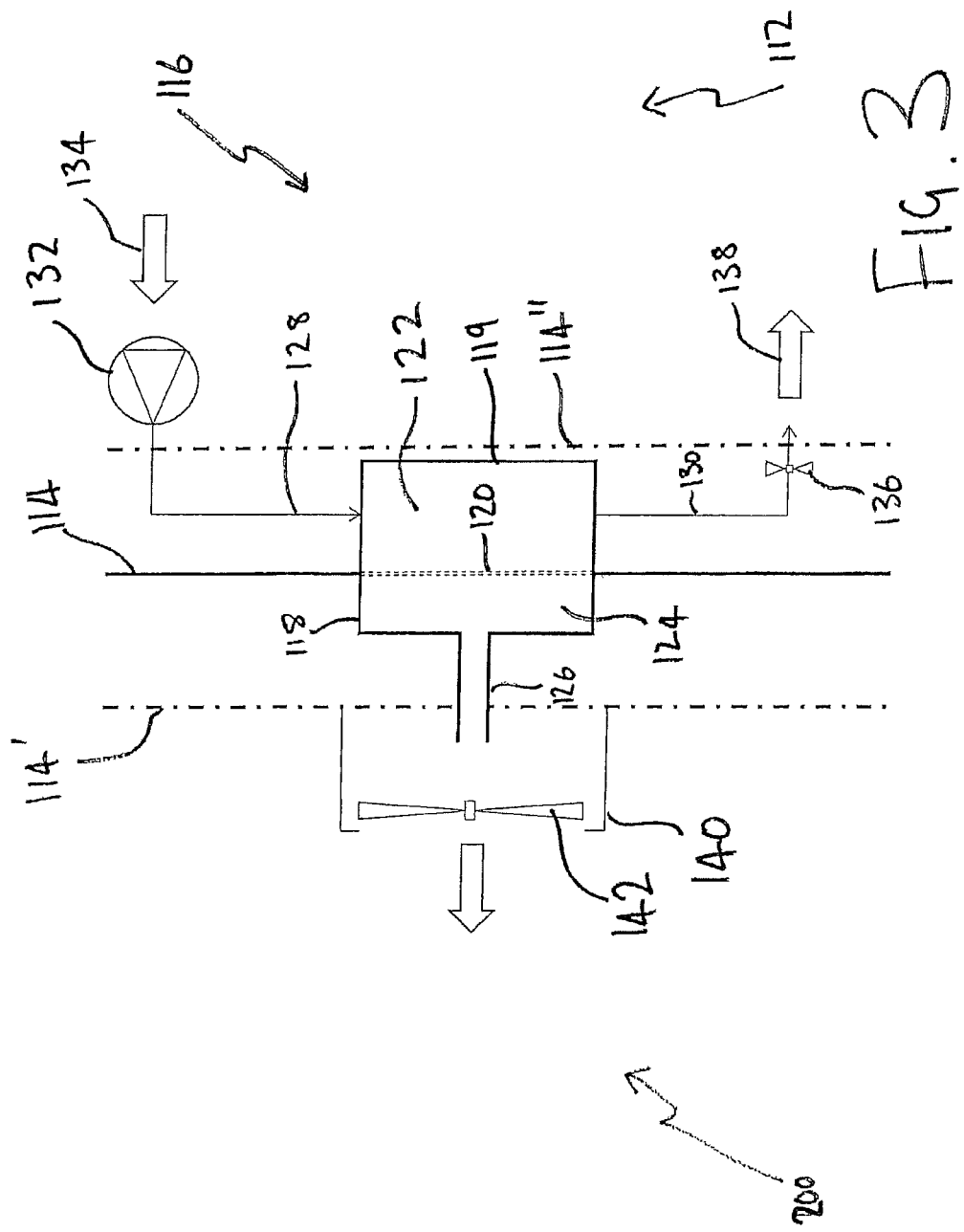

ATMOSPHERE CONTROL FOR CARGO STORAGE SPACES

The present disclosure relates to atmosphere control for cargo storage spaces, such as containers.

When perishable goods are to be transported, they are often stored in specialised cargo storage containers which comprise systems to reduce the perishing rate of the goods such that they arrive at their destination as fresh as possible.

In order to reduce perishing in such containers, a variety of systems are used but, most commonly, a combination of refrigeration and atmosphere control of the cargo space of the container are utilised to minimise the rate of perishing. Refrigeration of the cargo space can reduce the rate of growth of any harmful microbes which could cause the goods to perish. Furthermore, lower temperature can slow aerobic respiration of the cargo and also postpone ripening. Atmosphere control can help to maintain or control the proportions of the constituent gases of the atmosphere at levels which reduce perishing, respiration, and ripening.

In particular, it is important to control the carbon dioxide ($CO_2$) and oxygen ($O_2$) concentration in the cargo space of the container. High $CO_2$ levels can result in damage to perishable cargo. Furthermore, different types of cargo may have different optimum $CO_2$ concentrations for increased life. Accordingly, it is important to control the $CO_2$ concentration in cargo spaces.

Various systems are available for controlling the atmosphere in containers, but these are often inefficient, power-intensive, or complex, or single-use, which can be problematic when containers which are largely unattended for multiple long transport periods away from mains power and maintenance, for example at sea on container vessels. Accordingly, it will be understood that improvements are desirable in the area of atmosphere control in cargo spaces, such as containers.

According to a first aspect there is provided a controlled atmosphere system for a cargo storage space, the system comprising a separation area for receiving atmospheric gas from the cargo storage space, a gas moving device arranged to move atmospheric gas from the cargo storage space into the separation area to thereby increase a pressure within the separation area, and a molecular sieve arranged in communication with the separation area such that, when the separation area is at an overpressure, molecules, in particular selected molecules, are vented out of the separation area through the molecular sieve.

The controlled atmosphere system may be for controlling the atmosphere within the cargo storage space. For the avoidance of doubt, where the term "atmosphere" or "atmospheric" are used in the present description, these terms should be understood refer to the atmosphere within the cargo storage space. Atmospheric gas from the cargo storage space may also be referred to generally as "atmosphere" in the present disclosure. Where it is desired to refer to the environment outside the cargo storage space (i.e. the atmosphere of the Earth or a larger enclosed space in which the cargo storage space is located) then the term "ambient" will be used.

The controlled atmosphere system may be for controlling levels of constituent gases of the atmosphere within the cargo storage space. The controlled atmosphere system may be for removing molecules or particles of certain gases (i.e. selected molecules) and retaining molecules or particles of other gases from the atmosphere of the cargo storage space.

The separation area may be separated from the cargo storage space by a barrier. The barrier may be a housing. The separation area may be a substantially enclosed volume. The separation area may be partially defined by the molecular sieve. The separation area may be a volume separate to the cargo storage space. The separation area may be separated from the cargo storage space by the housing. The molecular sieve may define a boundary of the separation chamber. The separation area may have one or more inlets for receiving atmospheric gas from the cargo storage space. The inlet may have a non-return valve to prevent back flow from the separation area to the cargo storage space via the inlet.

The gas moving device may be of any type which can move atmospheric gas from the cargo storage space to the separation area, such as a fan, pump, compressor, or any other component suitable for removing atmospheric gas from the cargo storage space and forcing it into the separation area to thereby increase pressure within the separation area. Multiple gas moving devices may be provided. The gas moving device may be controllable to thereby alter the pressure within the separation area. The flow rate or speed of the gas moving device may be controllable to thereby alter a rate of flow of atmospheric gas from the cargo storage space into the separation area.

The molecular sieve may be for permitting the passage of selected molecules or particles. In other words, the selected molecules may be molecules of certain types which are permitted or able to pass through the molecular sieve. The molecular sieve may prevent or inhibit the passage of molecules or particles of other types. Molecules which are permitted to pass through the molecular sieve may be selected molecules. The molecular sieve may be substantially impermeable to all or some molecules unless a predetermined pressure gradient or overpressure exists between the separation area and the opposite side of the molecular sieve. Such as pressure gradient is referred to as an overpressure.

The predetermined pressure gradient or overpressure may be from 0.0002 bar to 4 bar, or, in particular, approximately 0.5 bar, 1 bar, or 2 bar. The molecular sieve may be a membrane which is permeable only to certain molecules or particles, such as the selected molecules. The molecular sieve may permit the passage of carbon dioxide or be permeable to carbon dioxide. The molecular sieve may permit the passage of ethylene or be permeable to ethylene. The molecular sieve may prevent or inhibit the passage of oxygen and/or nitrogen or be impermeable to oxygen and/or nitrogen.

The controlled atmosphere systems described herein may provide atmospheric control more efficiently or with a lesser power requirement than other systems. The systems described herein do not require $CO_2$ absorbent material to remove $CO_2$ from the cargo storage space, nor do they require active $O_2$ control or the provision of $O_2$ replacement. Furthermore, the systems herein described are simpler than some existing systems and can require reduced maintenance. Accordingly, these systems may be more reliable and cheaper, which is of great importance when cargo is transported for long distances and durations, during which maintenance may not be possible or available.

The separation area may further comprise a return outlet for flowing recirculated gas from the separation area to the cargo storage space, the return outlet provided with a throttling valve for throttling flow from the separation area to the cargo storage space. The return outlet may be arranged to vent directly into the cargo storage space, or may vent into an intermediate area in communication with the cargo storage space.

Recirculated gas may be gas which is returned to the cargo storage area after having passed through the separation area. Recirculated gas may have a different concentration of certain gases, such as a lower CO2 concentration than the atmospheric gas in the cargo storage space.

The throttling valve may be controllable to thereby alter the pressure within the separation area. The throttling valve may be completely closable to prevent flow therethrough. The throttling valve may be controllable to alter a flow rate therethrough. The throttling valve may be a pressure relief valve which opens only once a pressure gradient between the separation area and the cargo storage space reaches a predetermined level.

Molecules vented through the molecular sieve may be vented into the ambient environment. (i.e. directly into the environment outside the cargo storage space). The molecular sieve may have an exterior surface thereof exposed to the ambient environment. A shield may be provided to protect the molecular sieve from damage or contact with substances from the ambient environment, such as sea water, rain, animals, insects, or other contaminators.

A venting area may be arranged on an opposite side of the molecular sieve to the separation area such that molecules are vented out of the separation area into the venting area through the molecular sieve. The molecular sieve may be arranged between the separation area and the venting area. All molecules passing from the separation area to the venting area may have to pass through the molecular sieve.

The separation area and the venting area may be in fluid communication via the molecular sieve. A flow path may be provided between the separation area and the venting area, and the molecular sieve may be arranged within the flow path such that all molecules passing from the separation area to the venting area must pass through the molecular sieve. The venting area may be also defined by the housing of the separation area.

The venting area may be an enclosed area or volume having a venting outlet. The venting area may be freely opened to ambient environment. The venting outlet may be freely in communication with the ambient environment. The venting area may be an enclosed storage tank for storing molecules sieved from the atmospheric gas in the separation tank.

The molecular sieve may be arranged within a sieve chamber such that the separation area is a portion of the sieve chamber on a first side of the molecular sieve and the venting area is a portion of the sieve chamber on a second side of the molecular sieve.

The separation area may be arranged within the cargo storage space. For example, the separation area may be arranged within a unitary module within the cargo storage space. The gas moving device may be arranged within the module.

The venting area may be arranged outside the cargo storage space or within the cargo storage space. The venting area may be arranged within the module, or may be arranged outside the cargo storage space in communication with the separation area via the molecular sieve.

The separation area and the venting area may both be arranged outside the cargo storage space. The module may be arranged outside the cargo storage space or on an exterior thereof. Any of the separation area, venting area, or module may be arranged within an air conditioning or refrigerating unit.

The controlled atmosphere system may further comprise a sensor for detecting one or more characteristics of the atmospheric gas in the cargo storage space. The sensor may be in communication with the gas moving device and/or the throttling valve.

In use, if the detected characteristic detected by the sensor reaches a predetermined threshold or limit, a control signal may be sent to alter the operation of the gas moving device and/or the throttling valve. If the predetermined threshold is reached, the gas moving device may be activated, or its flow rate or speed increased. If the predetermined threshold is reached, the throttling valve may increase the throttling of the flow or may close completely.

The detected characteristic may be a carbon dioxide concentration in the atmospheric gas in the cargo storage space. The predetermined threshold may be a maximum threshold of carbon dioxide concentration (such as 5% CO2, 10% CO2, 15% CO2, 20% CO2, or 21% CO2) or a minimum threshold of oxygen or nitrogen concentration.

According to a second aspect, there is provided a cargo storage unit comprising a cargo storage space and a controlled atmosphere system. The controlled atmosphere system may be arranged to control the atmosphere of the cargo storage space. The controlled atmosphere system may have any features of the controlled atmosphere systems herein described.

The cargo storage unit may be an intermodal freight container or shipping container. The cargo storage unit may further comprise a refrigeration or air conditioning unit for cooling the cargo storage space.

The controlled atmosphere system, such as a venting area thereof, may be in communication with a condenser of the refrigeration unit such that molecules sieved from the separation area by the molecular sieve can be vented to the condenser section. The condenser section may comprise a fan for moving air through or past the condenser coil and for venting air in the condenser section to the ambient environment. The fan may also be operable to expel sieved molecules vented into the condenser section from the condenser section. An airflow produced by the condenser fan may cause sieved molecules in the venting area to be moved into the condenser section and then into the ambient environment.

According to a third aspect, there is provided a method of controlling the atmosphere of a cargo storage space comprising providing a separation area for receiving atmospheric gas from the cargo storage space, providing a molecular sieve in communication with the separation area, and creating an overpressure in the separation area by moving atmospheric gas from the cargo storage space into the separation area to thereby vent molecules from the separation area through the molecular sieve.

The method may be a method of operating the controlled atmosphere systems herein described. The cargo storage area, the separation area, the venting area, and or the molecular sieve of the method may be as herein described.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which:

FIG. 3 is a detailed sectional side view of an alternative arrangement of the controlled atmosphere system of FIG. 2.

Figure 1:
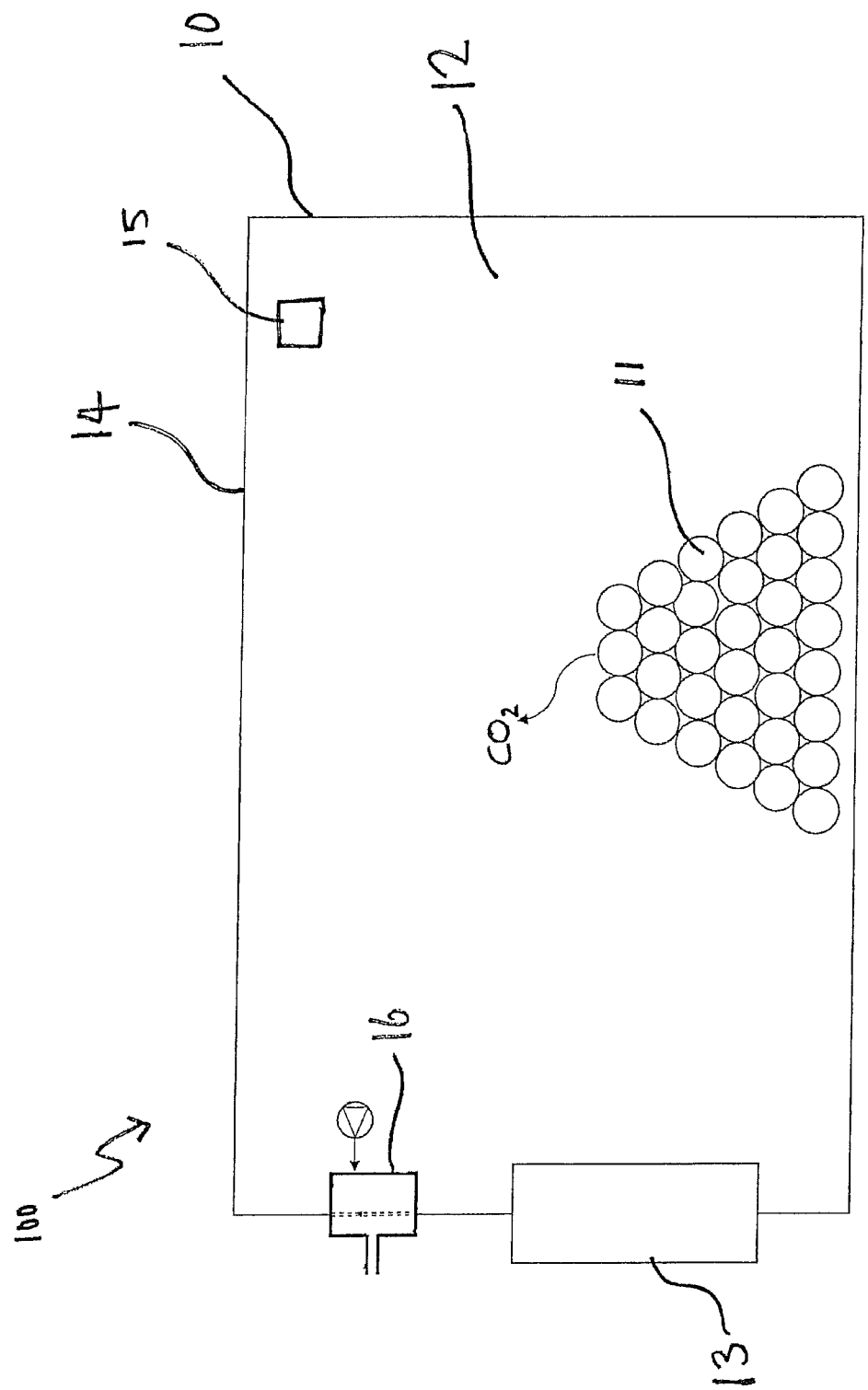
FIG. 1 is a sectional side view of a cargo storage unit having a controlled atmosphere system.

Referring to FIG. 1, a cargo storage unit or container 10 is shown. The container 10 may be any type of container suitable for transporting cargo 11 within an internal cargo storage space or volume 12. A refrigeration unit 13 is provided to cool the atmosphere within the cargo storage space 12. The cargo storage space 12 within the container 10 is enclosed on all sides by walls 14 of the container 10. The walls 14 of the container 10 may be insulated to reduce heat ingress into the refrigerated cargo storage space 12. While the cargo storage space 12 may be entirely enclosed by the container walls 14, it should be understood that a relatively low airflow may occur between the cargo storage space 12 and the ambient environment 100 outside of the container due to small gaps in the container walls 14, such as between panels or doors (not shown).

In certain cases, the cargo 11 may be perishable. Perishable cargo 11 gives of carbon dioxide ($CO_2$) as it respires, which increases the $CO_2$ concentration in the atmosphere of the cargo storage space 12. As an increased $CO_2$ concentration can be associated with increased respiration rate for the cargo 11, it is generally desirable to remove $CO_2$ from the atmosphere from the cargo storage space 12 if the $CO_2$ concentration increases above a certain predetermined value. A sensor 15 may be provided to measure $CO_2$ concentration. In some cases, the sensor 15 may also or alternatively measure other values, such as oxygen ($O_2$) or nitrogen (N) concentration.

The need to remove $CO_2$ from the atmosphere of the cargo storage space 12 is at odds with the need maintain refrigeration and/or treatments in (e.g. with inert gases) the atmosphere in order to reduce respiration of the cargo 10. Excessive free airflow between the cargo storage space 12 and the ambient environment 100 may be undesirable, as cooled atmosphere or treatment may be lost into the environment 100, which may increase the power consumption of the refrigeration unit 13, or require further treatment to be added to the atmosphere of the cargo storage space 12, which may not be feasible during long-distance transport of the container 10.

In order to maintain the atmosphere of the cargo storage space 12 at acceptable $CO_2$ levels, a controlled atmosphere system 16 is provided.

Figure 2:
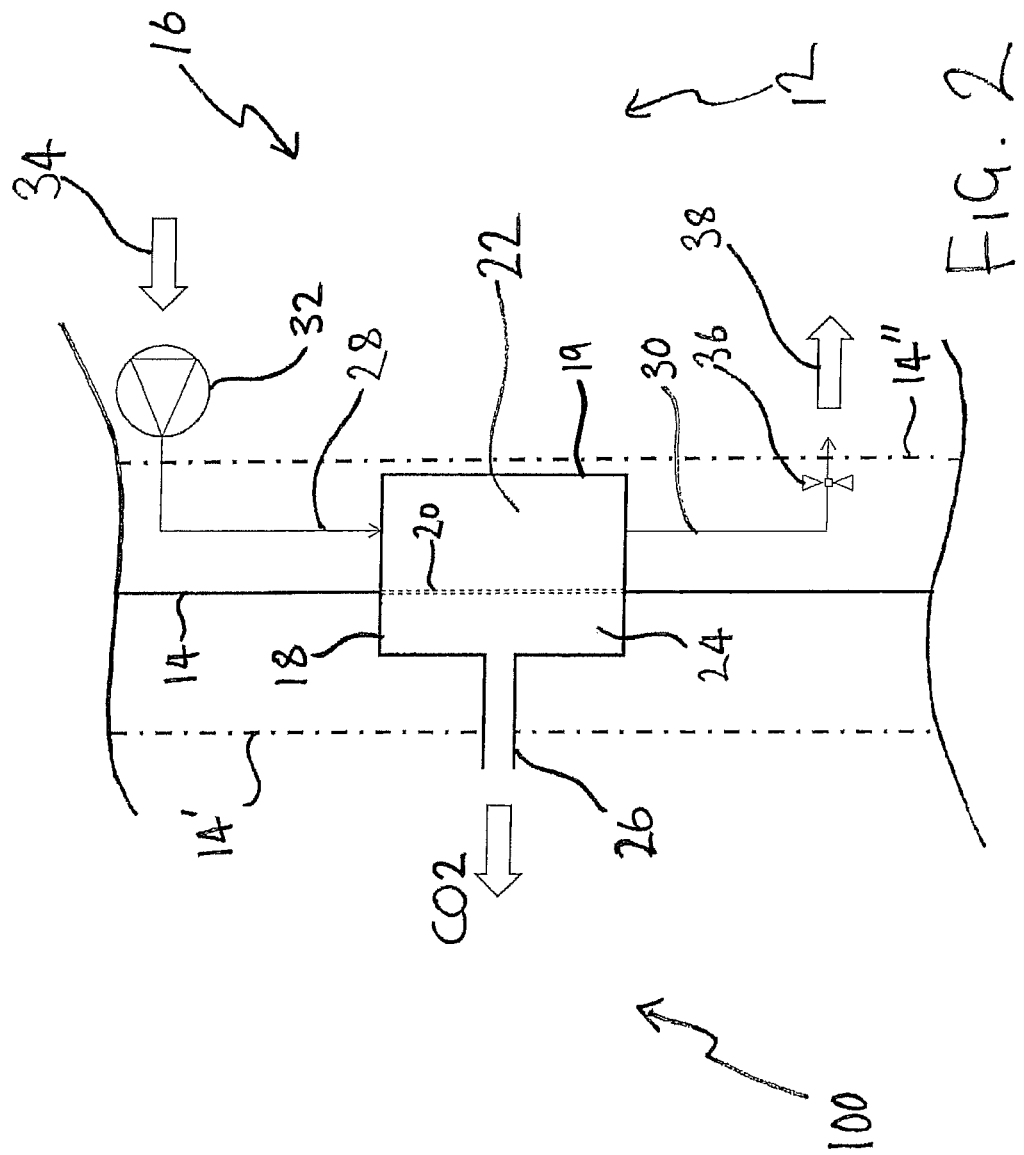
FIG. 2 is a detailed sectional side view of the controlled atmosphere system of FIG. 1.

A first embodiment of the controlled atmosphere system 16 is shown in FIG. 2.

The controlled atmosphere system 16 comprises a sieve chamber 18 which houses a molecular sieve 20. The molecular sieve 20 extends across the sieve chamber 18, dividing the chamber 18 into two areas either side of the sieve 20.

A first area 22 of the chamber 18 on the internal side of the molecular sieve 20 is a separation chamber 22. A housing 19 forms a barrier separating the separation chamber 22 from the cargo storage space 12. The separation chamber 22 is a volume enclosed by the housing 19 and the sieve 20 which is separated from the main volume of the cargo storage space 12. Thus, the sieve 20 forms a boundary of the separation chamber 22.

A second area 24 of the sieve chamber 18 arranged on an external side of the molecular sieve 20 is a venting area 24. The venting area 24 is also enclosed by the housing 19 and the sieve 20. An outlet 26 is provided from the venting area 24 to the ambient environment 100. The separation area 22 and the venting area 24 can be thought of as distinct and separate chambers or areas which are separated by the molecular sieve 20. The sieve 20 therefore forms a boundary between the separation area 22 and the venting area 22.

Other arrangements can be envisaged but, generally, the separation chamber 24 must be separated from the venting area 24 by the sieve such that any gas contained within the separation area 22 must pass through the sieve 20 to enter the venting chamber 24.

The separation chamber 22 is in communication with the cargo storage space 12 via an inlet 28 in the form of an inlet line, and via an outlet 30 in the form of an outlet line. Each of the inlet 28 and the outlet 30 may comprise a non-return mechanism such that gas within the separation chamber cannot exit via the inlet 28 or enter via the outlet 30.

A gas moving device 32, such as a gas pump, a fan, or a compressor, is arranged to move atmospheric gas 34 from the cargo storage space 12 into the separation area 22 via the inlet 28. The gas moving device 32 has a variable flow rate or speed for adjusting the rate at which atmospheric gas 34 enters the separation area 22. The outlet 30 of the separation area 22 is provided with a throttling valve 36 which is operable to throttle or restrict flow of recirculated gas 38 back into the cargo storage space 12 from the separation area 22. The throttling valve 36 can be adjusted to vary the flow rate of recirculated gas 38 back to the storage space 12.

If the throttling valve 36 restricts flow such that the flow rate of recirculated gas 38 into the separation area 22 is less than a flow rate of atmospheric gas 34 into the separation area 22, the pressure in the separation area 22 will increase. Accordingly, a desired overpressure can be built up in the separation area 22 by controlling the gas moving device 32 and the throttling valve 36. The overpressure generated in the separation area 22 may be, for example 1-2 bar above the pressure in the cargo storage space 12 and the ambient environment 100.

It will be understood that as the venting area 24 is in free communication with the ambient environment 100 via the outlet 26, the venting area 24 will be at atmospheric pressure. Accordingly, when the separation area is maintained at an overpressure above atmospheric pressure by the gas moving device 32 and throttling valve 36, a pressure gradient will exist across the molecular sieve 20 acting in a direction from the separation area 22 to the venting area 24. This pressure gradient will act to force gas in the separation area through the molecular sieve 20 to the venting area 24.

The molecular sieve 20 is designed to permit the passage of only certain molecules therethrough, which may also be referred to as selected molecules. In this case, as it is desired to reduce the $CO_2$ concentration in the atmosphere of the cargo storage space 12, the molecular sieve 20 permits the passage of $CO_2$ while inhibiting the passage of the other constituents of the atmospheric gas 34, such as oxygen and nitrogen. Therefore, the overpressure in the separation area 22 will force $CO_2$ molecules out of the separation area into the venting area 24, thereby reducing the overall concentration of CO in the separation area 22. As the pressure gradient is in the direction from the separations area 22 to the venting area 24, this prevents $CO_2$ from the venting area from passing through the sieve 20 in the opposite direction.

Consequently, the recirculated gas 38 which re-enters the cargo storage space 12 has a significantly lower $CO_2$ concentration than the atmospheric gas 34 which enters the separation chamber 22. Thus, the controlled atmosphere system 16 acts to remove $CO_2$ from the atmosphere of the cargo storage space 12. It should be understood that the rate of removal of $CO_2$ through the molecular sieve 20 is substantially proportional to the pressure gradient across the sieve 20. The rate of removal of $CO_2$ may also be substantially proportional to the $CO_2$ concentration gradient between the venting area 24 and the separation area 22.

Thus, if a low rate of CO2 removal is required, the overpressure in the separation area 22 can be decreased by reducing the gas moving device 32 flow rate, reducing the flow restriction of the valve 36, or a combination of both. Conversely, if a higher rate of CO2 removal is desired, then the overpressure in the separation area 22 can be increased by increasing the flow rate of the gas moving device 32, increasing the flow restriction in the valve 36, or a combination of both. Thus, the CO2 removal rate from the cargo storage space by the controlled atmosphere system 16 can be carefully controlled by adjusting the overpressure in the separation area 22.

It should also be understood that an overpressure in the separation area 22 can also be created if the outlet 30 and the throttling valve 36 are omitted. For example, the gas moving device 32 can simply create an overpressure in the separation area 22 by moving atmospheric gas 34 into the separation area 22 without returning any gas back into the cargo storage space 12. Accordingly, such a system would still remove CO2 from the atmosphere of the cargo storage space 12.

In some examples, the sensor 15 may be part of a controller (not shown) for controlling the controlled atmosphere system 16. At a first time, the sensor 15 may indicate to the controller that the CO2 concentration in the cargo storage space 12 is of an acceptable level below a predetermined threshold or limit, such as 10% CO2 concentration. When the CO2 concentration is at an acceptable level, then the controller will maintain the gas moving device 32 as off and the throttling valve in an open configuration. At a later time, the sensor 15 may detect that the CO2 concentration in the cargo storage space has reached 12%. The controller will deduce that this is above the threshold of 10% CO2 concentration and power on the gas moving device 32 and throttle the valve 36 to generate an overpressure in the separation area 22 which will sieve CO2 from the atmosphere of the cargo storage space 12. At a yet later time, the sensor 15 may detect that the CO2 concentration has fallen to 8%, which is below the threshold, and the controller may switch the gas moving device 32 off and open the throttling valve 36 to stop further CO2 removal.

In other examples, instead of switching off the gas moving device 32 and opening the valve 36 when the CO2 concentration is in the acceptable range, the gas moving device 32 or the valve 36 may be controlled to provide a reduced overpressure in the, and thus a lower rate of CO2 removal. As the CO2 concentration in the cargo storage space 12 increases, the overpressure in the separation area 22, and thus the CO2 removal rate, may be increased by controlling the gas moving device 32 and valve 36, either in a stepped or sliding fashion corresponding to the current CO2 concentration in the cargo storage space 12.

In other examples, the gas moving device 32 and throttling valve 36 may operate constantly to maintain a predetermined CO2 removal rate which may be determined based upon the predicted rate of release of CO2 by the perishable cargo 11. In yet other examples, the gas moving device 32 and throttling valve 36 may be controlled by a controller to provide a variable CO2 removal rate based upon either a predicted variance in CO2 release rate by the cargo 11. For example, it may be known that a particular type of cargo has a low CO2 release rate for the first ten days of storage and a high release rate thereafter, so a control program for the gas moving device 32 and valve 36 may be provided to increase the overpressure in the separation chamber, and thus the CO2 removal rate, after 10 days of storage.

In FIG. 2, the molecular sieve 20 is shown as being arranged coplanar with the container wall 14. Consequently, the sieve chamber 18 spans the wall 14, with the venting area 24 outside of the container 10 and the separation area being inside the container 10 (i.e. inside the cargo storage space 12). Two other alternative configurations of the controlled atmosphere system 16 are shown by the alternative wall configurations 14' and 14".

If the wall is located at 14', then the entire system 16 apart from the end of the venting outlet 26 is arranged inside the cargo storage space 12. This arrangement may be advantageous as it prevents environmental damage to the components of the system 16, which are protected from the ambient environment by the wall 14'. Furthermore, this arrangement may improve insulation of the container 10, as the aperture required in the wall 14' for the outlet 26 is smaller than that required for the entire sieve chamber 18 in wall 14.

If the wall is located at 14", then the sieve chamber 18 and thus the separation and venting areas 22, 24 are arranged outside the container 10 (and the cargo storage space 12). The gas moving device 32 is shown inside the space 12 and the valve 36 is shown outside, but it should be understood that both the gas moving device 32 and the valve 36 may be arranged inside or outside the wall 14". In this arrangement, access to the controlled atmosphere 16 is improved such that monitoring, maintenance or the like can be performed more easily without requiring access to the cargo storage space 12 itself.

In a yet further arrangement, the wall 14 may be arranged as shown in FIG. 1, but the venting area 24 and outlet 26 may be omitted such that the molecular sieve 20 is directly exposed to the ambient environment. In such an arrangement it should be understood that the venting area is then the ambient environment, rather than a part of the sieve chamber 18.

As CO2 is removed from the cargo storage space 12, it must be replaced by other gases, or else the pressure in the cargo storage space 12 would drop. It will be understood that the flow rate of CO2 out of the container 10 may be negligible relative to the overall volume of the cargo storage space, but nevertheless, air must enter to replace the lost CO2. In some cases, air from the ambient environment 100 may enter through small gaps in the container walls 14. In other examples, a dedicated passage (not shown) may be provided for allowing air to flow into the cargo storage space 12, although this will be relatively small to avoid losses of refrigerated air or treatment as discussed above.

An alternative example of a controlled atmosphere system 116 is illustrated in FIG. 3. Like features of the system 116 with system 16 of FIG. 2 are shown with reference numerals differing by 100.

In this alternative example, the outlet 126 of the venting area 124 vents into a condenser section 140 of the refrigeration unit 13. The condenser section 140 comprises a fan 142 for moving air through the condenser to remove heat from the condenser 140. Thus, the airflow through the condenser 140 can help to vent CO2 from the venting area 124 more effectively and expel it into the ambient environment 200. This arrangements is advantageous, as the venting of CO2 can be improved without requiring additional fans or pumps to move CO2 which has passed out of the separation area 122 via the molecular sieve 120.

In the examples shown in FIGS. 2 and 3, the controlled atmosphere system 16 and 116 can be packaged neatly in a module (not shown). This module can be arranged wherever is required in the container 10 or cargo storage space 12, 112. In some cases, the controlled atmosphere system 16 or the module may be arranged or installed as part of the refrigeration unit 13 or retro-fitted to the refrigeration unit 13 such that the refrigeration unit 13 can provide both refrigeration and atmospheric control.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A controlled atmosphere system for a cargo storage space, the system comprising:
   a separation area for receiving atmospheric gas from the cargo storage space;
   a gas moving device arranged to move atmospheric gas from the cargo storage space into the separation area to thereby increase a pressure within the separation area; and
   a molecular sieve including a membrane which is permeable to selected molecules, the molecular sieve being arranged in communication with the separation area such that, when the separation area is at an overpressure, the selected molecules are continuously vented out of the separation area through the molecular sieve at a removal rate that is substantially proportional to a pressure gradient across the molecular sieve.

2. A controlled atmosphere system as claimed in claim 1, wherein the separation area is separated from the cargo storage area by a barrier.

3. A controlled atmosphere system as claimed in claim 2, wherein the barrier is a housing.

4. A controlled atmosphere system as claimed in claim 1, wherein the molecular sieve defines a boundary of the separation area.

5. A controlled atmosphere system as claimed in claim 1, wherein the separation area further comprises a return outlet for flowing recirculated gas from the separation area to the cargo storage space, the return outlet provided with a throttling valve for throttling flow from the separation area to the cargo storage space.

6. A controlled atmosphere system as claimed in claim 5, wherein the throttling valve is controllable to thereby alter the pressure within the separation area.

7. A controlled atmosphere system as claimed in claim 1, wherein the gas moving device is controllable to thereby alter the pressure within the separation area.

8. A controlled atmosphere system as claimed in claim 1, wherein the selected molecules vented through the molecular sieve are vented into an ambient environment.

9. A controlled atmosphere system as claimed in claim 1, wherein a venting area is arranged on an opposite side of the molecular sieve to the separation area such that the selected molecules are vented out of the separation area into the venting area through the molecular sieve.

10. A controlled atmosphere system as claimed in claim 9, wherein the venting area is an enclosed area having a venting outlet.

11. A controlled atmosphere system as claimed in claim 10, wherein the molecular sieve is arranged within a sieve chamber such that the separation area is a portion of the sieve chamber on a first side of the molecular sieve, and the venting area is a portion of the sieve chamber on a second side of the molecular sieve.

12. A controlled atmosphere system as claimed in claim 1, wherein the separation area is arranged within the cargo storage space.

13. A controlled atmosphere system as claimed in claim 9, wherein the venting area is arranged outside the cargo storage space or within the cargo storage space.

14. A controlled atmosphere system as claimed in claim 9, wherein the separation area and the venting area are arranged outside the cargo storage space.

15. A controlled atmosphere system as claimed in claim 1, wherein the selected molecules comprise carbon dioxide molecules.

16. A controlled atmosphere system as claimed in claim 1, wherein the molecular sieve inhibits the passage of oxygen and/or nitrogen molecules therethrough.

17. A controlled atmosphere system as claimed in claim 1, further comprising a sensor for detecting one or more characteristics of the atmospheric gas in the cargo storage space.

18. A controlled atmosphere system as claimed in claim 17, further comprising a controller for adjusting the overpressure in the separation area by adjusting the operation of the gas moving device and/or the throttling valve based upon the detected characteristic.

19. A controlled atmosphere system as claimed in claim 17, wherein the detected characteristic is a carbon dioxide concentration in the atmospheric gas in the cargo storage space.

20. A cargo storage unit comprising a cargo storage space and a controlled atmosphere system in accordance with claim 1, the gas moving device being arranged to receive atmospheric gas from the cargo storage space for moving into the separation area.

21. A cargo storage unit as claimed in claim 20, further comprising a refrigeration unit for cooling the cargo storage space.

22. A cargo storage unit as claimed in claim 21, wherein the controlled atmosphere system is in communication with a condenser section of the refrigeration unit such that the selected molecules sieved from the separation area by the molecular sieve can be vented to the condenser section.

23. A cargo storage unit as claimed in claim 20, wherein the cargo storage unit is an intermodal freight container.

24. A method of controlling the atmosphere of a cargo storage space comprising:
   providing a separation area for receiving atmospheric gas from the cargo storage space;
   providing a molecular sieve in communication with the separation area, the molecular sieve including a membrane which is permeated by selected molecules; and
   creating an overpressure in the separation area by moving atmospheric gas from the cargo storage space into the separation area to thereby continuously vent the selected molecules from the separation area through the molecular sieve at a removal rate that is substantially proportional to a pressure gradient across the molecular sieve.

* * * * *